(12) United States Patent
Wu

(10) Patent No.: US 6,428,736 B1
(45) Date of Patent: Aug. 6, 2002

(54) METHOD FOR FORMING A HOLLOW BOTTOM OF ACRYLIC CUPS

(76) Inventor: Cheng-Hsu Wu, 2F, No. 5, Lane 54, Sec. 1, Chung Hua West Road, Tainan (TW)

( * ) Notice: Subject to any disclaimer, the term of this patent is extended or adjusted under 35 U.S.C. 154(b) by 0 days.

(21) Appl. No.: 09/371,851

(22) Filed: Aug. 11, 1999

(51) Int. Cl.[7] ............................................. B29D 24/00
(52) U.S. Cl. ....................... 264/510; 264/512; 264/513; 264/572; 264/573; 264/129; 264/132; 264/154; 264/161; 264/237; 264/328.1; 264/348
(58) Field of Search ................................ 264/510, 154, 264/161, 129, 132, 237, 348, 328.1, 572, 573, 512, 513

(56) References Cited

U.S. PATENT DOCUMENTS 4,017,243 A * 4/1977 Lindsay ...................... 425/292
5,611,988 A * 3/1997 Mahajan ...................... 264/523
6,066,287 A * 5/2000 Brady et al. ................. 264/513

* cited by examiner

*Primary Examiner*—Suzanne E. McDowell
(74) *Attorney, Agent, or Firm*—Rosenberg, Klein & Lee

(57) ABSTRACT

A method for forming a hollow bottom of an acrylic cup by forming a cup body by injecting a molding with a liquid transparent or semi-transparent acrylic material into a mold to form a mushroom shaped cavity. The cavity in the bottom of the cup body is filled with a gas, permitting the whole cup to appear to have a three dimensional (3D) visual effect. The cavity of the bottom of the cup can be filled with a non-colored or colored liquid to permit the whole cup to contain a deflected visual effect of a plurality of colored layers.

5 Claims, 4 Drawing Sheets

METHOD FOR FORMING A HOLLOW BOTTOM OF ACRYLIC CUPS

BACKGROUND OF THE INVENTION

This invention relates to a method for forming a hollow bottom of acrylic cups, particularly by forming a cup body by injecting a liquid transparent or semi-transparent acrylic material into a mold, and injecting a gas or a liquid in a hollow bottom of acrylic cups to provide the acrylic cups with special visual effects.

Traditional cups are generally made up of different materials and contain different visual effects with designs or pictures, etc., for consumers to select. However, the bottoms of cups are generally devoid of changes or originality to attract attention.

SUMMARY

This invention has been devised to offer a method for forming hollow bottoms of acrylic cups, by forming a cup body by injecting a mold with a transparent or semi-transparent acrylic material, and injecting a gas or a liquid in a hollow bottom of acrylic cups to provide the acrylic cups with special visual effects.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
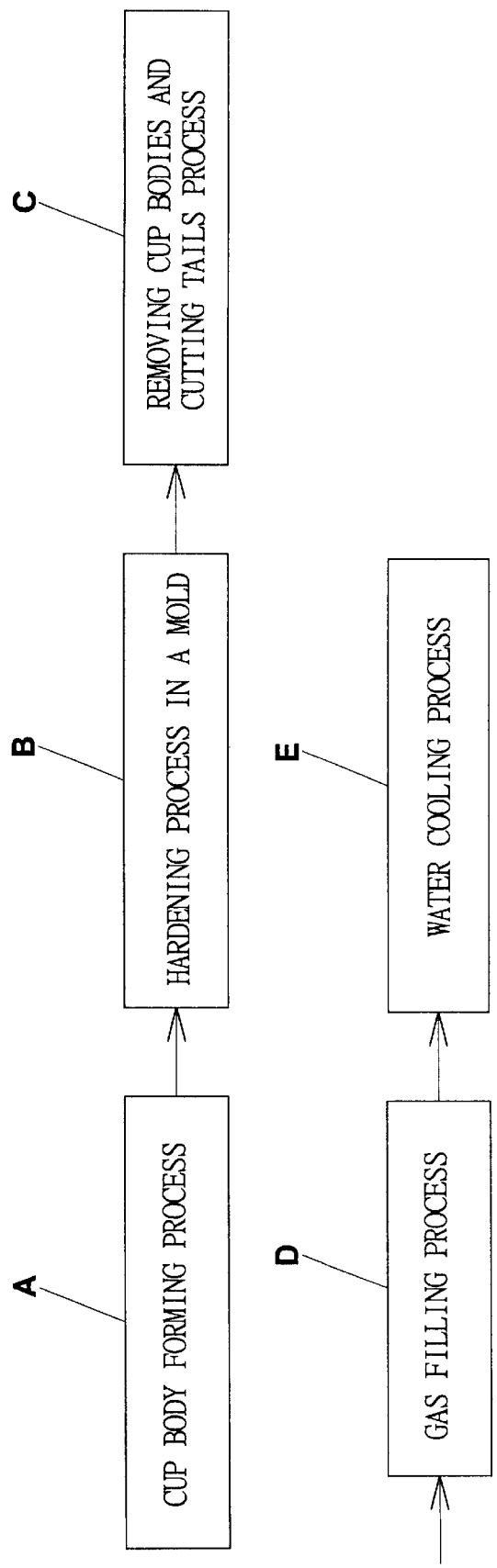
FIG. 1 is a flow chart of the first forming method for a hollow bottom of an acrylic cup.

A flow chart of the first forming method for a hollow bottom of an acrylic cup of the present invention is shown in FIG. 1, including a cup body forming process A, a hardening process in a mold B, removing the cup bodies and cutting the tails process C, a gas filling process D, and a water cooling process.

Figure 2:
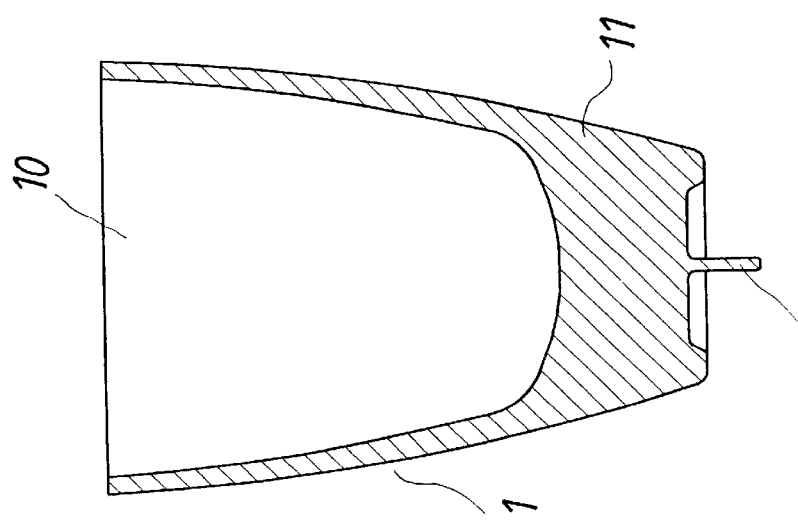
FIG. 2 is a cross-sectional view of an acrylic cup with a tail formed by the first forming method of the present invention.
Figure 8:
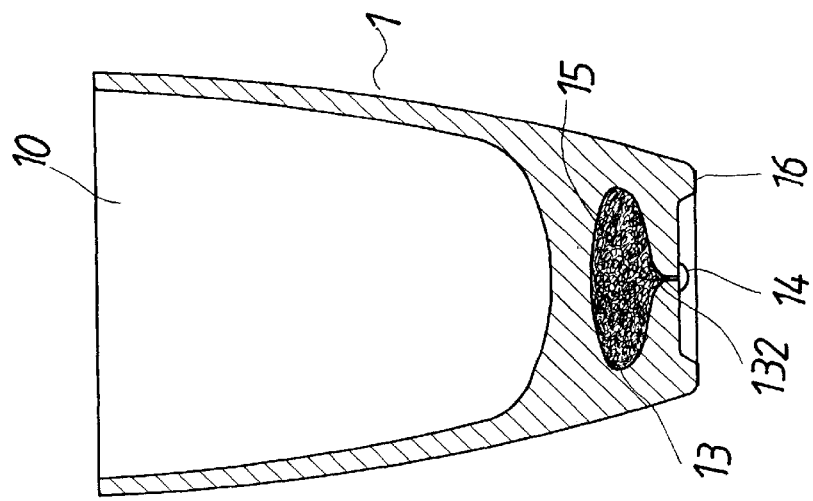
FIG. 8 is a cross-sectional view of an acrylic cup formed by the second forming method of the present invention, with an annular bottom surface color painted.

The cup forming process A is performed by injecting the molding with a transparent or semi-transparent acrylic material at 170° C. to form a cup body 1, which has a hollow center 10 and a thick bottom 11 under the hollow center 10, as shown in FIG. 2.

The hardening process in the mold B is performed by cooling the cup body 1 in the mold for approximately 45 seconds and letting the outer surface of the cup body 1 harden.

Figure 3:
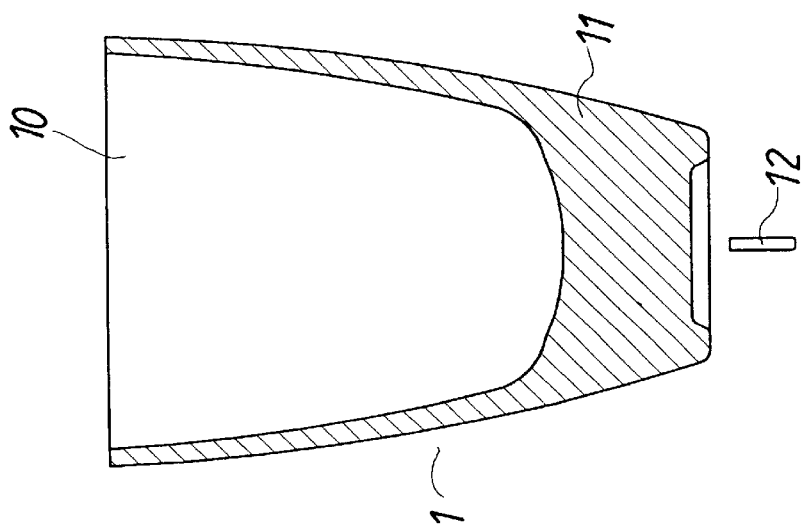
FIG. 3 is a cross-sectional view of an acrylic cup with a tail formed by the first forming method of the present invention, with the tail cut off.

The removing cup bodies and cutting tails process is enacted by removing the cup body 1 from the mold and cutting the tail (unwanted hardened acrylic material) extending down from the center of the lower surface of the bottom 11, as shown in FIG. 3.

Figure 4:
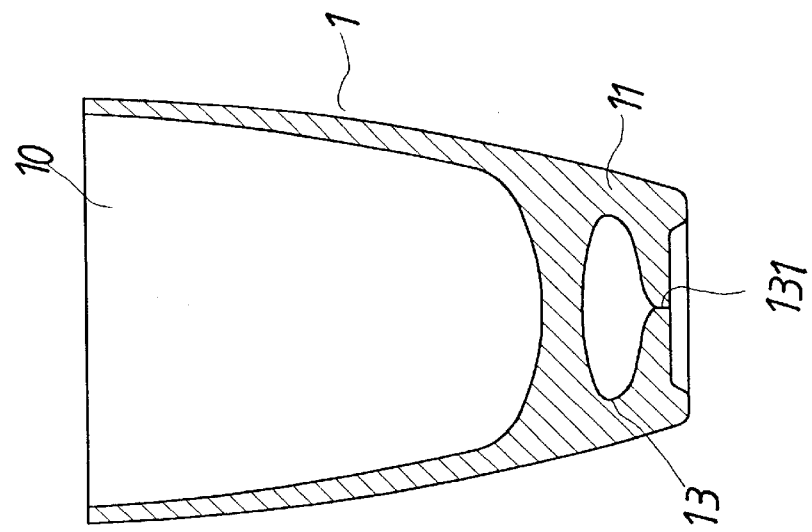
FIG. 4 is a cross-sectional view of an acrylic cup with its bottom filled with a gas of the present invention.

The gas filling process D is fulfilled by inserting a needle of a syringe into the center portion of the lower surface of the bottom to inject a certain amount of gas in the interior of the bottom 11 which is not yet completely hardened to form a mushroom-shaped cavity 13, as shown in FIG. 4. Afer the injection of the gas in the gas filling process D, there may be a very slender hole 131 in the point where the needle is removed, however, the hole 131 will gradually close upon hardening.

Figure 5:
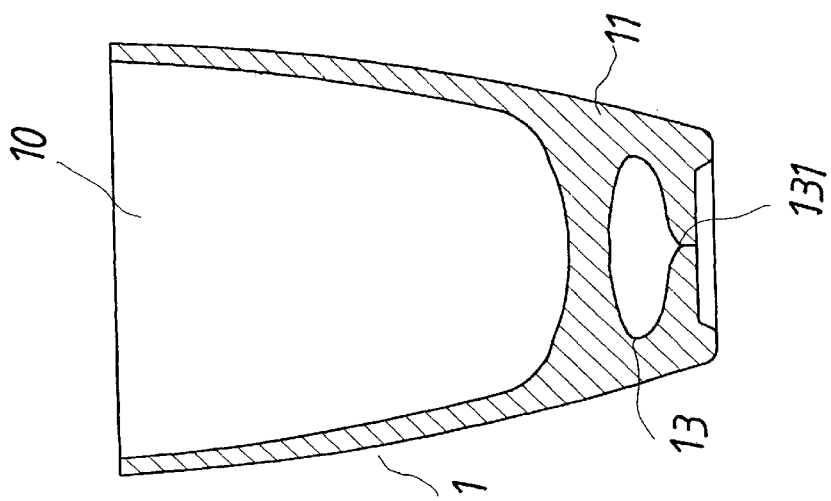
FIG. 5 is a cross-sectional view of an acrylic cup with its bottom formed with a gas cavity of the present invention.

The water cooling process E is performed by placing the bottom 11 of the cup body 1 in water in a container letting the bottom 11 gradually cool with the cavity 13 becoming hard, as shown in FIG. 5.

The finished acrylic cup 1 with the cavity 13 in the bottom 11 may contain a 3D configuration or a 3D visual effect when seen through the transparent or the semi-transparent wall of the cup body mixed when the bottom 11 cools off with the cavity 13.

Figure 6:
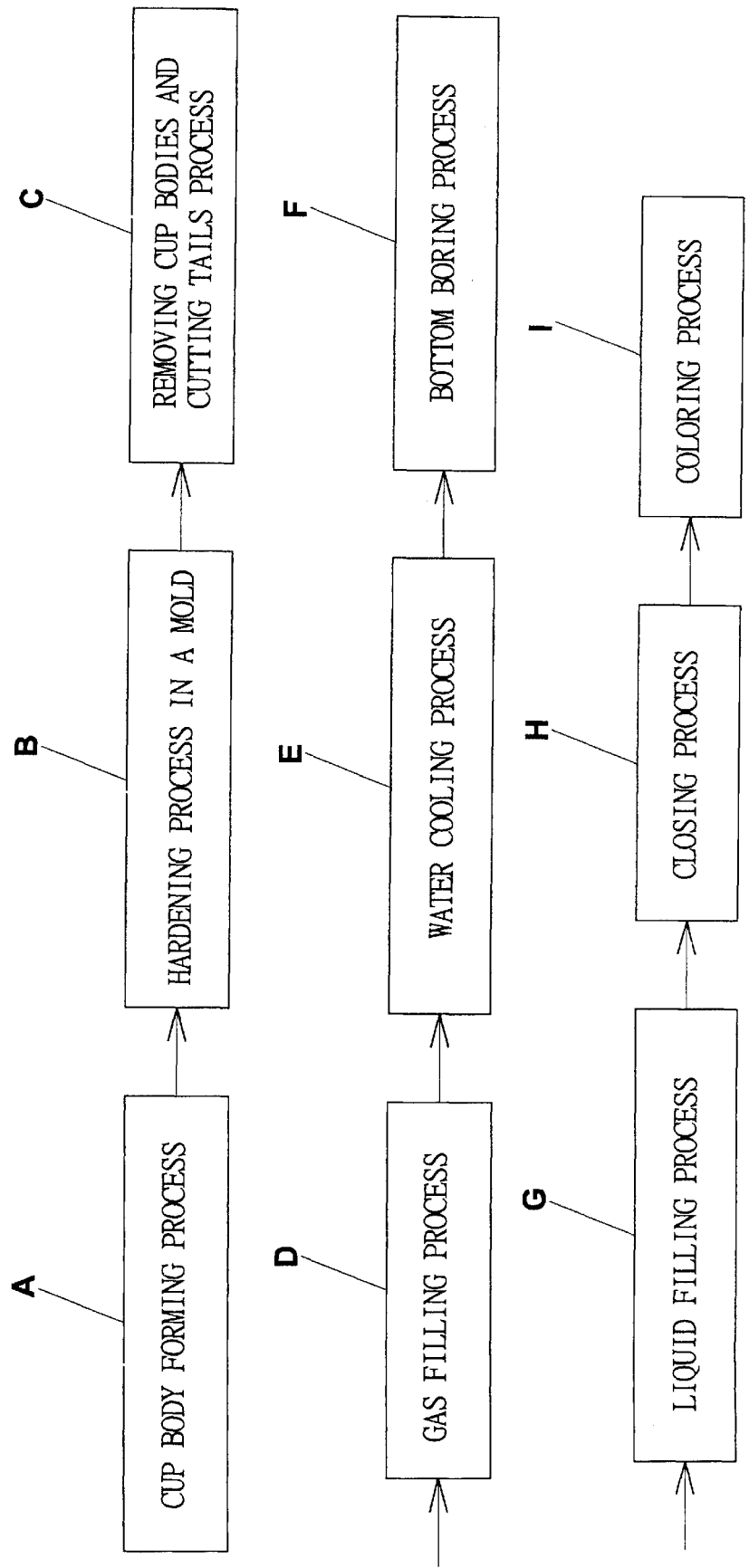
FIG. 6 is a flow chart of a second forming method for a hollow bottom of an acrylic cup of the present invention.

In addition to the forming method discussed above, an acrylic cup may also be made by a second forming method which includes a bottom boring process F, a liquid filling process G, a closing bottom process H, and a coloring process I, as shown in FIG. 6.

The bottom boring process F is performed by boring another hole 132, preferably through the filling hole 131, to allow the cavity 13 to communicate with the outside of the bottom 11.

The gas filling process G occurs by filling a liquid 15 into the cavity. The liquid 15 may include a color pigment.

Figure 7:
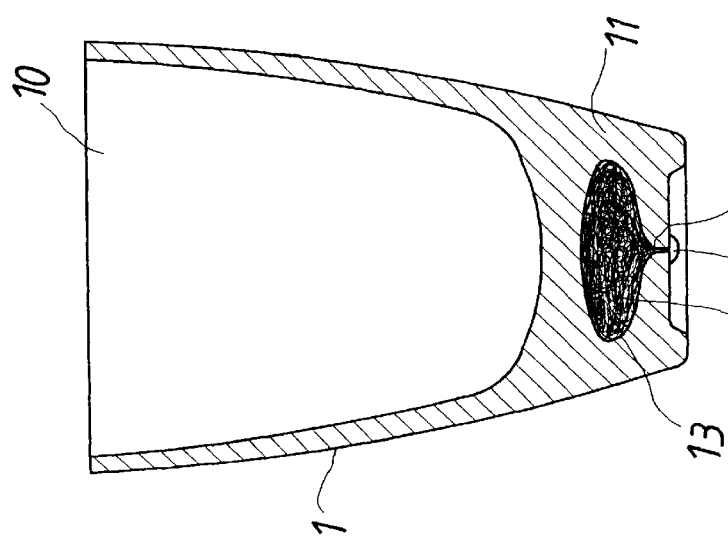
FIG. 7 is a cross-sectional view of an acrylic cup formed by the second forming method of the present invention, with a closing stud fixed under a filling hole.

The closing process H is performed by closing the hole 132 with a closing stud 14 made out of the same material as the cup body 1, as shown in FIG. 7.

The coloring process I is enacted by painting the annular edge 16 of the lower surface 111 of the cup body's bottom 11 with a color, and permitting the cup body 1 to present a color reflecting phenomenon.

Many layers of reflected colors may be seen through the transparent or semi-transparent wall of the cup body 1 since a colored cavity 13 exists in the cup body bottom 11 and the colored annular edge 111.

What is claimed is:

1. A method for forming a hollow bottom of an acrylic cup comprising the steps of:
   a. forming a cup body by injecting a liquid transparent or semi-transparent acrylic material into a mold;
   b. cooling said cup body to permit an outer surface of said cup body to harden;
   c. removing said cup body from said mold and excising unwanted hardened acrylic material from said cup body;
   d. injecting gas through a needle inserted through a central portion of a bottom region of the cup body whereby gas injected into an interior volume of said bottom region forms a cavity region having a slender hole; and,
   e. inserting said bottom region of said cup body in water to allow said interior volume of said bottom region to cool and harden.

2. The method of claim 1, including the step of injecting liquid into said cavity region.

3. The method of claim 1 where said liquid is color pigmented.

4. A method for forming a hollow bottom of an acrylic cup comprising the steps of:
  a. forming a cup body by injecting a liquid transparent or semi-transparent acrylic material into a mold;
  b. cooling said cup body to permit an outer surface of said cup body to harden;
  c. removing said cup body from said mold and excising unwanted hardened acrylic material from said cup body;
  d. injecting gas through a needle inserted through a central portion of a bottom region of the cup body whereby gas is injected into an interior volume of said bottom region forms a cavity region having a slender hole;
  e. inserting said bottom region of said cup body in water to allow said interior volume of said bottom region to cool and harden;
  f. boring a hole into a central portion of a lower surface of said bottom region to allow said cavity region to communicate with an exterior of said bottom region;
  g. injecting a liquid into said cavity region through a boring hole;
  h. closing said boring hole in said bottom region by fixing an acrylic stud on an open mouth of said boring hole to prevent leakage from said cavity region; and
  i. color painting an annular edge of a lower surface of said bottom region for providing a plurality of colored layers to intercross with other colors.

5. The method of claim 4, wherein said liquid injected into said cavity region is color pigmented.

* * * * *